(12) United States Patent
Rumpsa et al.

(10) Patent No.: US 9,051,901 B2
(45) Date of Patent: Jun. 9, 2015

(54) EXHAUST GAS RECIRCULATION (EGR) SYSTEM

(75) Inventors: Todd Anthony Rumpsa, Saline, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 886 days.

(21) Appl. No.: 13/155,019

(22) Filed: Jun. 7, 2011

(65) Prior Publication Data

US 2012/0316753 A1 Dec. 13, 2012

(51) Int. Cl.
*F02M 25/07* (2006.01)
*F02D 21/08* (2006.01)
*F02D 41/00* (2006.01)

(52) U.S. Cl.
CPC ........... *F02M 25/0707* (2013.01); *Y02T 10/121* (2013.01); *F02D 21/08* (2013.01); *F02M 25/0701* (2013.01); *F02M 25/0709* (2013.01); *F02M 25/0732* (2013.01); *F02M 25/0738* (2013.01); *F02M 25/0754* (2013.01); *F02M 25/0755* (2013.01); *F02D 41/0065* (2013.01); *F02D 41/0007* (2013.01); *F02D 41/005* (2013.01); *F02D 2041/0012* (2013.01); *F02D 2200/0418* (2013.01); *Y02T 10/47* (2013.01)

(58) Field of Classification Search
CPC ... Y02T 10/47; Y02T 10/121; F02D 41/0047; F02D 41/0077; F02M 25/07; F02M 25/0701; F02M 25/0704; F02M 25/071; F02M 25/0709; F02M 25/0726; F02M 25/0738
USPC ................ 701/102, 108; 123/568.11, 568.12, 123/568.21, 568.23, 568.24, 698; 60/605.2, 60/273
See application file for complete search history.

(56) References Cited

U.S. PATENT DOCUMENTS

| | | | |
|---|---|---|---|
| 5,732,688 A * | 3/1998 | Charlton et al. | 123/568.12 |
| 5,834,249 A | 11/1998 | Furukawa et al. | |
| 6,152,118 A | 11/2000 | Sasaki et al. | |
| 7,356,403 B2 | 4/2008 | Yoshioka et al. | |
| 7,469,691 B2 | 12/2008 | Joergl et al. | |
| 8,286,616 B2 * | 10/2012 | Clarke et al. | 123/568.21 |
| 8,601,813 B2 * | 12/2013 | Shutty et al. | 60/605.2 |
| 2003/0114978 A1 * | 6/2003 | Rimnac et al. | 701/108 |
| 2003/0192516 A1 * | 10/2003 | Brunemann et al. | 123/568.12 |
| 2005/0021218 A1 * | 1/2005 | Bhargava et al. | 701/108 |
| 2007/0144501 A1 * | 6/2007 | Joergl et al. | 123/568.12 |
| 2008/0229744 A1 * | 9/2008 | Gronberg | 60/605.2 |
| 2009/0188475 A1 * | 7/2009 | Ueda | 123/568.12 |
| 2009/0320467 A1 * | 12/2009 | Kardos et al. | 60/605.2 |
| 2010/0326408 A1 * | 12/2010 | Clarke et al. | 123/568.21 |
| 2011/0023839 A1 * | 2/2011 | Styles et al. | 123/568.12 |
| 2011/0036335 A1 * | 2/2011 | Wood et al. | 123/568.21 |
| 2011/0041816 A1 * | 2/2011 | Hsia et al. | 123/568.12 |
| 2011/0048389 A1 * | 3/2011 | Hsia et al. | 123/568.12 |

FOREIGN PATENT DOCUMENTS

WO 2009/150790 A1 12/2009

* cited by examiner

*Primary Examiner* — Erick Solis
*Assistant Examiner* — Anthony L Bacon
(74) *Attorney, Agent, or Firm* — Julia Voutyras; Alleman Hall McCoy Russell & Tuttle LLP

(57) ABSTRACT

Various systems and methods are described for an exhaust gas recirculation (EGR) system coupled to an engine in a vehicle. One example method comprises, controlling an amount of EGR according to a minimum of a first EGR amount corresponding to a temperature of a first location and a second EGR amount corresponding to a condensate formation of a second location.

20 Claims, 3 Drawing Sheets

EXHAUST GAS RECIRCULATION (EGR) SYSTEM

TECHNICAL FIELD

The present application relates generally to an exhaust gas recirculation system coupled to an engine in a motor vehicle.

BACKGROUND AND SUMMARY

It may be desirable for an engine to include a turbocharger and exhaust gas recirculation (EGR) to reduce emissions of $NO_x$, CO, and other gasses and to improve fuel economy. However, low pressure exhaust gas recirculation (LP-EGR) can lead to high temperatures on components in the path of the LP-EGR gasses. For example, the turbocharger compressor inlet can heat up to an undesirable temperature due to the hot LP-EGR gasses. An EGR cooler may reduce the temperature of gasses, but the cooler can also condense water out. This can be problematic in any EGR system, but water droplets formed in a low-pressure EGR circuit can particularly degrade an aluminum compressor wheel of a turbocharger operating at high speed. Similarly, components in a high pressure exhaust gas recirculation (HP-EGR) path can be heated to undesirable temperatures or be exposed to condensate that may degrade the components.

One solution is to maintain a "base" EGR table, and to globally modify the table as needed to maintain temperatures and condensate levels below a threshold level. However, the global solution may be overly conservative resulting in an EGR rate that may be less than desired. The inventors herein have recognized the above issues and have devised an approach to at least partially address them. For example, the temperature and condensate constraints for some engine components may be generally independent and may only be affected in limited and unique areas of the EGR operating region.

In one example, a method for controlling an engine in a vehicle during engine operation is disclosed. The engine includes an intake passage and an EGR system. The method comprises controlling an amount of EGR according to a minimum of a first EGR amount corresponding to a temperature at a first location and a second EGR amount corresponding to condensate formation at a second location. The locations may both be in the LP-EGR system, or one may be in the LP-EGR system and the other in the HP-EGR system, for example. Further, the first location may correspond to a particular component, such as an EGR valve, that has the most severe temperature limitation, whereas the second location may correspond to the location most likely to form condensate, such as at a charge air cooler or at the compressor inlet. For example, at a first operating point, such as at low speed and high load, the condensate constraint at an output of the LP-EGR system upstream of the compressor may be a limit on EGR. At a second operating point, such as at mid-speed and load, the temperature constraint at a valve in the HP-EGR system may limit EGR. In this manner, the EGR rate may be maintained at a desirable level while still operating the engine components below a threshold temperature and reducing condensate formation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description relates to a method for an exhaust gas recirculation (EGR) system coupled to a turbocharged engine in a motor vehicle. In one non-limiting example, the engine may be configured as part of the system illustrated in FIG. 1. The system of FIG. 1 may be operated with a method such as the example illustrated in FIG. 2. For example, the EGR rate may be maintained at a desired total EGR rate by controlling an amount of EGR according to a minimum of a first EGR amount corresponding to a temperature at a first location and a second EGR amount corresponding to a condensate formation at a second location. For systems including an HP-EGR system and a LP-EGR system, the example method illustrated in FIG. 3 may be used to maintain the desired total EGR rate. For example, an amount of HP-EGR may be controlled according to a temperature of a first component of the engine and a condensate formation of a second component of the engine. An amount of LP-EGR may be controlled according to a temperature of a third component of the engine and a condensate formation of a fourth component of the engine. A total amount of EGR may be controlled according to a temperature of a fifth component of the engine and a condensate formation of a sixth component of the engine. In this manner, the EGR rate may be maintained a desirable level while still operating the engine components below a threshold temperature and condensate level.

Figure 1:
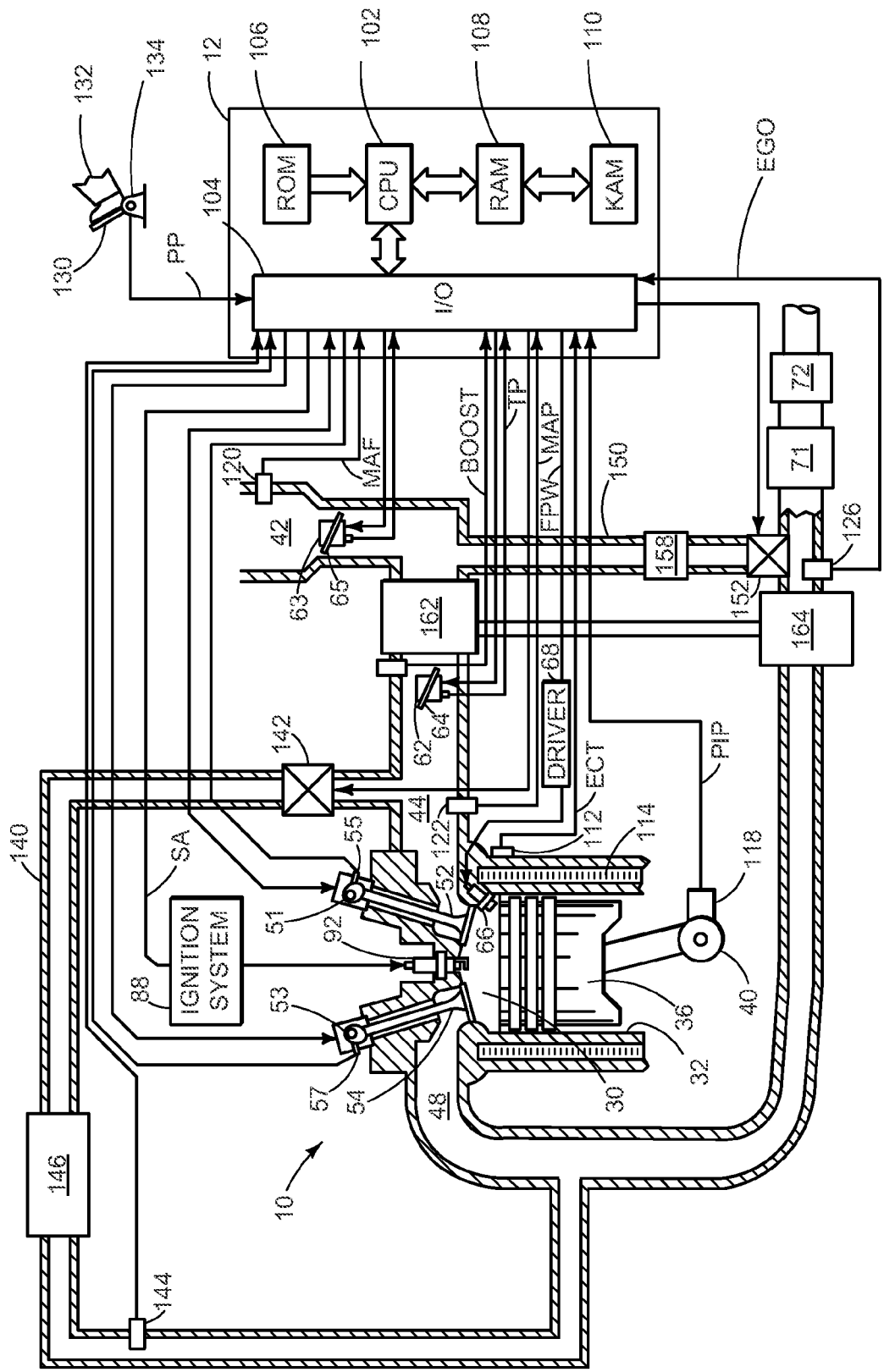
FIG. 1 shows a schematic diagram of an engine with a turbocharger and an exhaust gas recirculation system including a low pressure exhaust gas recirculation system and a high pressure exhaust gas recirculation system.

Referring now to FIG. 1, it shows a schematic diagram of one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Intake passage 42 may include a mass air flow sensor 120 and a manifold air pressure sensor 122 for providing respective signals MAF and MAP to controller 12.

Further, in the disclosed embodiments, an exhaust gas recirculation (EGR) system may route a desired portion of exhaust gas from exhaust passage 48 to intake passage 44 via high-pressure EGR (HP-EGR) passage 140 and/or low-pressure EGR (LP-EGR) passage 150. The amount of EGR provided to intake passage 44 may be varied by controller 12 via HP-EGR valve 142 or LP-EGR valve 152. In some embodiments, a throttle may be included in the exhaust to assist in driving the EGR. Further, an EGR sensor 144 may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high-pressure EGR system where EGR is routed from upstream of a turbine 164 of a turbocharger to downstream of a compressor 162 of a turbocharger and a low-pressure EGR system where EGR is routed from downstream of a turbine 164 of a turbocharger to upstream of a compressor 162 of the turbocharger. Further, as shown in FIG. 1, the HP-EGR system may include HP-EGR cooler 146 and the LP-EGR system may include LP-EGR cooler 158 to reject heat from the EGR gasses to engine coolant, for example. In alternative embodiments, engine 10 may include only an HP-EGR system or only an LP-EGR system.

As such, Engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. In an alternative embodiment, a charge air cooler may be included downstream from compressor 162 and upstream of intake valve 52.

Exhaust gas sensor 126 is shown coupled to exhaust passage 48 upstream of emission control system 70 and downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_X$, HC, or CO sensor.

Emission control devices 71 and 72 are shown arranged along exhaust passage 48 downstream of exhaust gas sensor 126. Devices 71 and 72 may be a selective catalytic reduction (SCR) system, three way catalyst (TWC), $NO_X$ trap, various other emission control devices, or combinations thereof. For example, device 71 may be a TWC and device 72 may be a particulate filter (PF). In some embodiments, PF 72 may be located downstream of TWC 71 (as shown in FIG. 1), while in other embodiments, PF 72 may be positioned upstream of TWC 72 (not shown in FIG. 1). Further, in some embodiments, during operation of engine 10, emission control devices 71 and 72 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Figure 2:
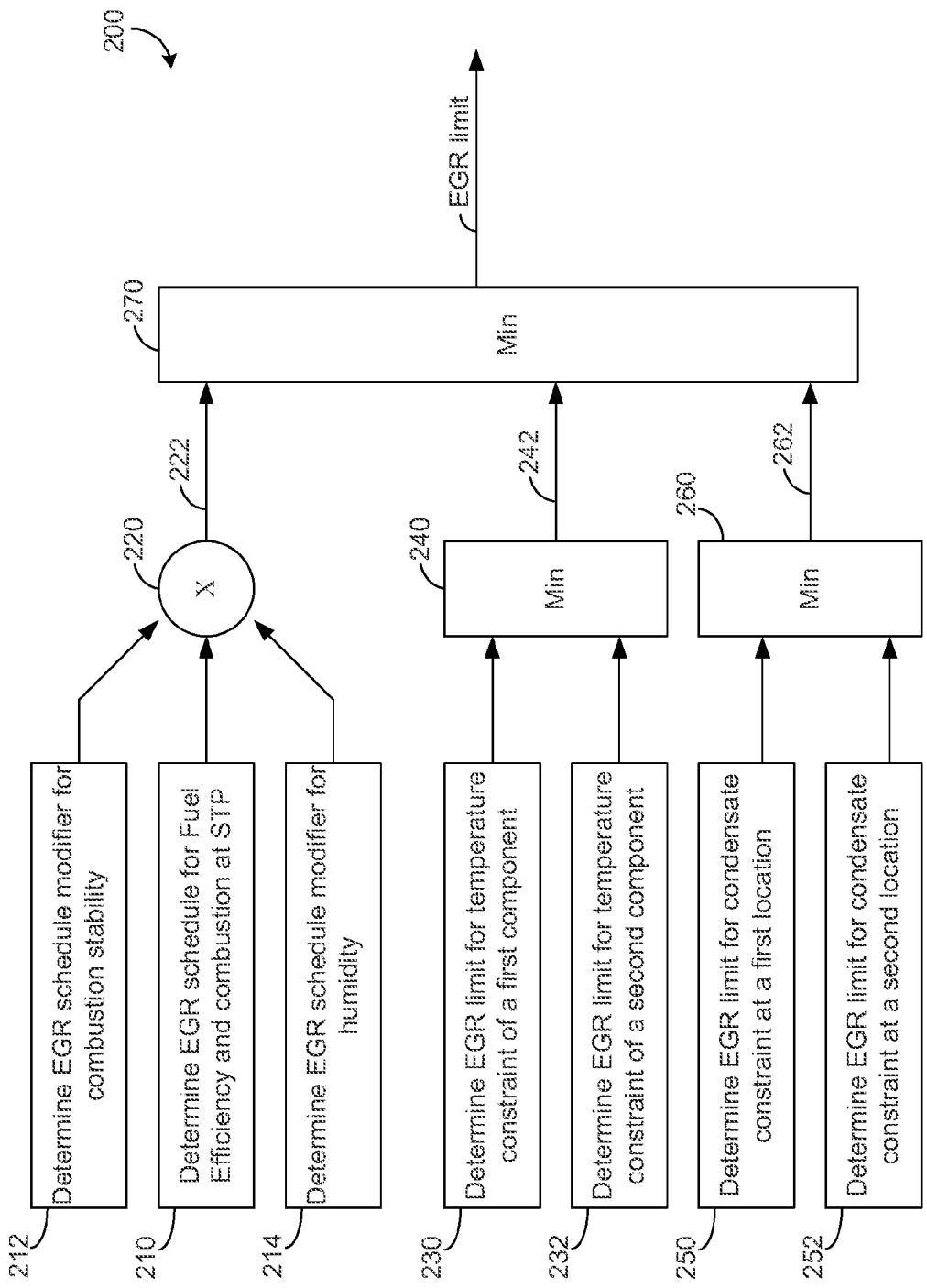
FIG. 2 shows a flow chart of an example exhaust gas recirculation system control method.

Turning to FIG. 2, a method 200 may be executed by an engine controller, such as 12, for controlling an EGR rate of engine 10. In one example, the EGR rate may be maintained at a desired total EGR rate by controlling an amount of EGR according to a minimum of a first EGR amount corresponding to a temperature at a first location and a second EGR amount corresponding to a condensate formation at a second location.

Continuing with FIG. 2, at 210, the method includes determining an EGR schedule corresponding to a base EGR amount, or base EGR rate, that achieves the desired fuel economy or emissions objectives. For example, the EGR schedule may be selected for optimal fuel economy and stable combustion at standard temperature and pressure. In one embodiment, the EGR schedule may be based on a "base" EGR table which is a function of engine speed and load. The engine speed may be measured from sensor 118 and engine load may be calculated from engine parameters derived from various combinations of sensors, such as a MAF sensor or a MAP sensor.

At 212, an EGR schedule modifier for combustion stability may be calculated. In one embodiment, the EGR schedule modifier for combustion stability may be a function of the engine coolant temperature (ECT) and air charge temperature (ACT). The ECT may be measured from temperature sensor 112. The ACT may be measured from a sensor in intake manifold 44 or calculated from a set of engine operating parameters. In one embodiment, the EGR schedule modifier for combustion stability may be a real value between one and zero.

At 214, an EGR schedule modifier for humidity of the charge air entering combustion chamber 30 may be calculated. In one embodiment, humidity may be directly measured by a sensor in intake manifold 44. In an alternate embodiment, the humidity of the charge air may be calculated from atmospheric humidity and a set of engine operating parameters. The amount of EGR may be reduced as humidity is increased to maintain an equivalent effective dilution. Similarly, the amount of EGR may be increased as humidity is decreased to maintain an equivalent effective dilution. In one embodiment, the EGR schedule modifier for humidity may be a real value between one and zero.

At 220, a maximum EGR rate for stable combustion 222 may be calculated. For example, the base EGR amount may be multiplied by the EGR schedule modifier for combustion stability and the EGR schedule modifier for humidity of the charge air. In this manner, the base EGR amount may be scaled for the combustion stability and humidity attributes.

At 230, an EGR amount corresponding to a temperature of a first component may be determined. In an alternative embodiment, an EGR amount corresponding to a temperature at a first location may be determined. For example, a temperature constraint may be placed on a component or location that may be damaged by temperatures that exceed a threshold temperature. By varying the EGR amount, the temperature may be controlled at a location or component. For example, reducing the EGR amount may reduce the temperature of the location or the component. Similarly, increasing the EGR amount may increase the temperature of the location or the component. In one embodiment, the temperature at the output of compressor 162 may be measured by a temperature sensor. A table may be generated associating the EGR amount to temperature at the output of compressor 162. In this manner, the EGR amount corresponding to the temperature of output of compressor 162 may be determined.

The temperature of multiple components or at multiple locations may be monitored and an EGR amount corresponding to a temperature of each component or location may be determined. For example, at 232, an EGR amount corresponding to a temperature of a second component may be determined. In one embodiment, a temperature may be measured by a temperature sensor. In an alternate embodiment, a temperature may be calculated from a set of engine operating parameters.

At 240, the EGR amounts corresponding to the temperatures of a set of components or locations may be compared. In one embodiment, the maximum EGR amount corresponding to component temperatures 242 is calculated by taking the minimum of the EGR amounts corresponding to the temperatures of the set of components or locations. If the EGR amount is maintained below the maximum EGR amount corresponding to component temperatures 242, each component may remain below its threshold temperature, potentially reducing damage to the components.

At 250, an EGR amount corresponding to a condensate constraint of a first component may be determined. In an alternative embodiment, an EGR amount corresponding to a condensate constraint at a first location may be determined. For example, a condensate constraint may be placed on a component or location that may be potentially damaged by condensate. Exhaust gasses may contain more moisture than clean intake air and so reducing the EGR amount may reduce the moisture reaching various components. If the moisture content exceeds the dew point for a given pressure and temperature, then condensation droplets may form. These droplets may damage the rapidly spinning compressor wheel or cause corrosion in a cooler, such as HP-EGR cooler 146, LP-EGR cooler 158, or a charge air cooler, for example. The condensation may also cause inaccurate sensor data, such as from exhaust gas sensor 126 downstream from turbine 164, for example.

By varying the EGR amount, the condensate may be controlled at a location or component. For example, reducing the EGR amount may reduce the condensate at the location or the component. Similarly, increasing the EGR amount may increase the condensate at the location or the component. In one embodiment, the conditions for condensation may be monitored by measuring the temperature, pressure, and humidity at a location of engine 10. In an alternate embodiment, the conditions for condensation may be monitored by calculating the temperature, pressure, and humidity at a location of engine 10 from various engine parameters.

The condensation constraints of multiple components or at multiple locations may be monitored and an EGR amount corresponding to a condensation constraint of each component or location may be determined. For example, at 252, an EGR amount corresponding to a condensation constraint of a second component may be determined.

At 260, the EGR amounts corresponding to the condensation constraints of a set of components or locations may be compared. In one embodiment, the minimum of the EGR amounts determine the maximum EGR amount corresponding to condensation constraints 262. If the EGR amount is maintained below the maximum EGR amount corresponding to condensation constraints 262, each component may remain below its threshold condensation constraint, potentially reducing damage to the components.

At 270, the maximum EGR rate for stable combustion 222, the maximum EGR amount corresponding to component temperatures 242, and the maximum EGR amount corresponding to condensation constraints 262 are compared to calculate an EGR limit for engine 10. In one embodiment, the EGR limit for engine 10 is the minimum of the maximum EGR rate for stable combustion 222, the maximum EGR amount corresponding to component temperatures 242, and the maximum EGR amount corresponding to condensation constraints 262. In this manner, the EGR rate may maintain desirable combustion stability, component temperatures, and condensation constraints.

In an alternate embodiment, at 270, the EGR limit for engine 10 may be determined from the minimum of the maximum EGR rate for stable combustion 222 and the maximum EGR amount corresponding to component temperatures 242. In yet another alternate embodiment, the EGR limit for engine 10 may be determined from the minimum of the maximum EGR rate for stable combustion 222 and the maximum EGR amount corresponding to condensation constraints 262.

The EGR amount corresponding to a temperature constraint for a specific location may vary over the operating range of the engine. Similarly, the EGR amount corresponding to a condensate constraint for a specific location may vary over the operating range of the engine. As the speed and load of engine 10 changes over its operating range, constraints at different locations may potentially constrain the EGR rate. For example, at a first operating point, such as at low speed and high load, the condensate constraint at the entrance into intake passage 42 from LP-EGR passage 150 may be a limit on EGR. Alternatively, the condensate constraint at an output of the charge air cooler or at EGR sensor 144 may be a limit on EGR, for example. At a second operating point, such as at mid-speed and load, the temperature constraint at HP-EGR valve 142 may limit EGR. At a third operating point, such as high speed and high load, the temperature constraint at LP-EGR valve 152 may limit EGR. By comparing the maximum EGR rate for stable combustion 222 to the EGR limits of each location at the current engine operating point, potentially only one EGR limit will constrain the EGR rate at a given operating point. For example, by taking the minimum of each EGR limit at 240, 260, and 270, potentially only one EGR limit will constrain the EGR rate at a given operating point.

Figure 3:
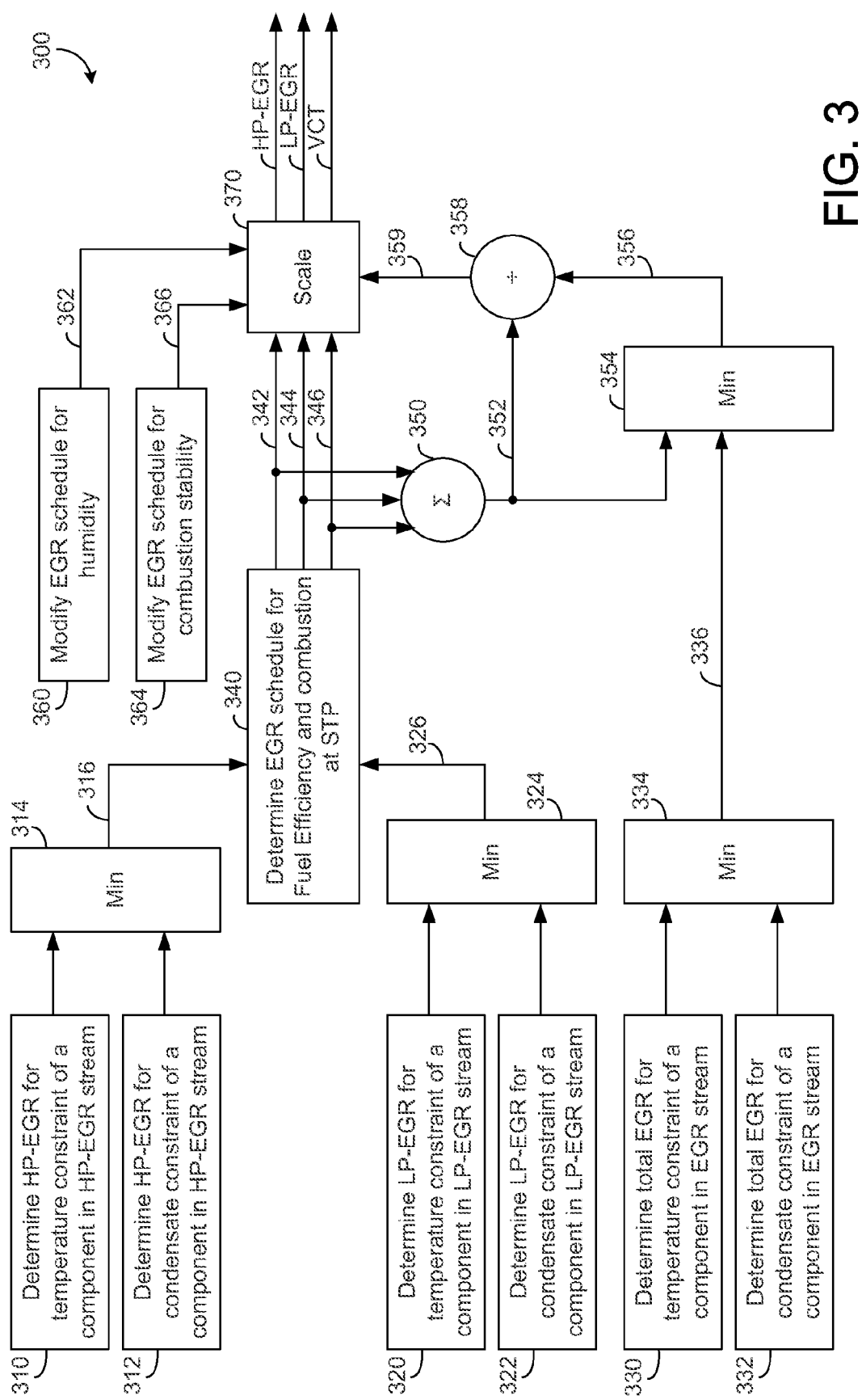
FIG. 3 shows a flow chart illustrating a control routine for an exhaust gas recirculation system including a low-pressure exhaust gas recirculation system and a high-pressure exhaust gas recirculation system.

Turning to FIG. 3, a method 300 may be executed by an engine controller, such as 12, for controlling an EGR rate of engine 10 including intake manifold 44, an HP-EGR system, and a LP-EGR system. In one example, the EGR rate may be maintained at a desired total EGR rate by controlling an amount of HP-EGR at a location upstream of intake manifold 44 according to a temperature of a first component of the engine and a condensate formation of a second component of the engine. An amount of LP-EGR at a location upstream of intake manifold 44 may be controlled according to a temperature of a third component of the engine and a condensate formation of a fourth component of the engine. The total amount of EGR may be controlled according to a temperature of a fifth component of the engine and a condensate formation of a sixth component of the engine.

Engine components in the HP-EGR stream may be subjected to different temperature and condensate conditions than engine components in the LP-EGR stream. Additionally, some engine components may be in the path of the total EGR stream that includes the HP-EGR and LP-EGR stream. Thus, it may be desirable to measure and control temperature and condensation formation conditions at various locations of the engine. For example, if a component in the HP-EGR stream is operating close to a temperature constraint, it may be desirable to decrease the amount of HP-EGR and increase an amount of LP-EGR. Similarly, if a component in the LP-EGR stream is operating close to a temperature constraint, it may be desirable to decrease the amount of LP-EGR and increase the amount of HP-EGR. In another example, total EGR may be increased by varying the operation of one or more of the intake and exhaust valves via a VCT, VVT, CPS or VVL system when a component in the HP-EGR stream is close to a temperature constraint.

Continuing with FIG. 3, at 310, method 300 may include determining an amount of HP-EGR at a location upstream of intake manifold 44 corresponding to a temperature constraint of a component of the engine. In an alternate embodiment, the amount of HP-EGR may be determined corresponding to a temperature constraint of a location of the engine. The temperature of the component may be measured with a temperature sensor or the temperature may be calculated from a set of engine operating conditions.

At 312, an amount of HP-EGR may be determined corresponding to a condensate constraint of a location of the engine. In an alternate embodiment, the amount of HP-EGR may be determined corresponding to a condensate constraint of a component of the engine. The condensate conditions may be determined by measuring pressure, temperature, and humidity at the location. Alternatively, the condensate conditions may be calculated from a set of engine operating conditions.

At 314, the maximum amount of HP-EGR 316 may be determined according to a temperature at a first location and a condensate formation at a second location. For example, the maximum amount of HP-EGR 316 may be calculated by comparing the HP-EGR amount calculated at 310 and the HP-EGR amount calculated at 312. In one embodiment, the maximum amount of HP-EGR 316 may be calculated from the minimum of the HP-EGR amount calculated at 310 and the HP-EGR amount calculated at 312. For example, HP-EGR cooler 146 and HP-EGR valve 142 located in the HP-EGR stream may each have an amount of HP-EGR corresponding to a temperature constraint and a condensate constraint. The maximum amount of HP-EGR 316 may be the maximum amount of HP-EGR to maintain HP-EGR cooler 146 and HP-EGR valve 142 at less than their respective temperature and condensate constraints.

At 320, method 300 may include an amount of LP-EGR at a location upstream of intake manifold 44 corresponding to a temperature constraint of a component of the engine. In an alternate embodiment, the amount of LP-EGR may be determined corresponding to a temperature constraint of a location of the engine. The temperature of the component may be measured with a temperature sensor or the temperature may be calculated from a set of engine operating conditions.

At 322, an amount of LP-EGR may be determined corresponding to a condensate constraint of a location of the engine. In an alternate embodiment, the amount of LP-EGR may be determined corresponding to a condensate constraint of a component of the engine. The condensate conditions may be determined by measuring pressure, temperature, and humidity at the location. Alternatively, the condensate conditions may be calculated from a set of engine operating conditions.

At 324, the maximum amount of LP-EGR 326 may be determined according to a temperature at a first location and a condensate formation at a second location. For example, the maximum amount of LP-EGR 326 may be calculated by comparing the LP-EGR amount calculated at 320 and the LP-EGR amount calculated at 322. In one embodiment, the maximum amount of LP-EGR 326 may be calculated from the minimum of the LP-EGR amount calculated at 320 and the LP-EGR amount calculated at 322. For example, LP-EGR cooler 158 and LP-EGR valve 152 located in the LP-EGR stream may each have an amount of LP-EGR corresponding to a temperature constraint and a condensate constraint. The maximum amount of LP-EGR 326 may be the maximum amount of LP-EGR to maintain LP-EGR cooler 158 and LP-EGR valve 152 at less than their respective temperature and condensate constraints.

At 330, method 300 may include an amount of total EGR corresponding to a temperature constraint of a component of the engine. In an alternate embodiment, the amount of total EGR may be determined corresponding to a temperature constraint of a location of the engine. The temperature of the component may be measured with a temperature sensor or the temperature may be calculated from a set of engine operating conditions.

At 332, an amount of total EGR may be determined corresponding to a condensate constraint of a location of the engine. In an alternate embodiment, the amount of total EGR may be determined corresponding to a condensate constraint of a component of the engine. The condensate conditions may be determined by measuring pressure, temperature, and humidity at the location. Alternatively, the condensate conditions may be calculated from a set of engine operating conditions.

At 334, the maximum amount of EGR 336 may be determined according to a temperature at a first location and a condensate formation at a second location. For example, the maximum amount of EGR 336 may be calculated by comparing the EGR amount calculated at 330 and the EGR amount calculated at 332. In one embodiment, the maximum amount of EGR 336 may be calculated from the minimum of the EGR amount calculated at 330 and the HP-EGR amount calculated at 332. For example, a charge air cooler and turbine 164 may each have an amount of EGR corresponding to a temperature constraint and a condensate constraint. The maximum amount of EGR 336 may be the maximum amount of EGR to maintain the charge air cooler and turbine 164 at less than their respective temperature and condensate constraints.

At 340, method 300 includes determining an EGR schedule corresponding to a base EGR amount, or base EGR rate, that achieves the desired fuel economy or emissions objectives. For example, the EGR schedule may be selected for optimal fuel economy and stable combustion at standard temperature and pressure. In one embodiment, the EGR schedule may be based on a "base" EGR table which is a function of engine speed and load. The EGR schedule may include an HP-EGR component 342, a LP-EGR component 344, and a VCT-EGR component 346. The HP-EGR component 342 may not be greater than the maximum amount of HP-EGR 316. The LP-EGR component 344 may not be greater than the maximum amount of LP-EGR 326. By breaking the total EGR into HP, LP, and VCT components, the total EGR may be maintained at a more desirable level if a component in the HP-EGR path or the LP-EGR path is at its temperature or condensate constraint. For example, if the LP-EGR amount is at a maximum, the HP-EGR amount may be increased to maintain the total EGR amount. As another example, if the HP-EGR amount is at a maximum, the VCT operation may be adjusted to increase the VCT-EGR amount to maintain the total EGR amount.

At 350, a total EGR amount 352 may be calculated by summing the HP-EGR component 342, the LP-EGR component 344, and the VCT-EGR component 346. At 354, the total EGR amount 352 may be compared to the maximum amount of EGR 336. The minimum of the total EGR amount 352 and the maximum amount of EGR 336 generates an allowed EGR amount 356. At 358, the allowed EGR amount 356 may be divided by the total EGR amount 352 to generate a total EGR scaling factor 359.

At 360, an EGR schedule modifier for humidity 362 of the charge air entering combustion chamber 30 may be calculated. In one embodiment, humidity may be directly measured by a sensor in intake manifold 44. In an alternate embodiment, the humidity of the charge air may be calculated from atmospheric humidity and a set of engine operating parameters. The amount of EGR may be reduced as humidity is increased to maintain an equivalent effective dilution. Similarly, the amount of EGR may be increased as humidity is decreased to maintain an equivalent effective dilution. In one embodiment, the EGR schedule modifier for humidity 362 may be a real value between one and zero.

At 364, an EGR schedule modifier for combustion stability 366 may be calculated. In one embodiment, the EGR schedule modifier for combustion stability 366 may be a function of the ECT and ACT. The ECT may be measured from temperature sensor 112. The ACT may be measured from a sensor in intake manifold 44 or calculated from a set of engine operating parameters. In one embodiment, the EGR schedule modifier for combustion stability 366 may be a real value between one and zero.

At 370, each of the HP-EGR component 342, the LP-EGR component 344, and the VCT-EGR component 346 may be scaled to account for one or more of temperature constraints, condensate constraints, humidity of charge air, and combustion stability. In one embodiment, the scaling factor may be a minimum of the total EGR scaling factor 359, the EGR schedule modifier for humidity 362, and the EGR schedule modifier for combustion stability 366. In an alternate embodiment, the scaling factor may be a product of the total EGR scaling factor 359, the EGR schedule modifier for humidity 362, and the EGR schedule modifier for combustion stability 366. The product of the HP-EGR component 342 and the scaling factor may generate the HP-EGR amount. The product of the LP-EGR component 344 and the scaling factor may generate the LP-EGR amount. The product of the VCT-EGR component 346 and the scaling factor may generate the VCT-EGR amount.

In this manner, method 300 may be used to route a first amount of EGR through the HP-EGR system and a second amount of EGR through the LP-EGR system. In one embodiment, the total amount of EGR may also be adjusted by varying the operation of one or more of the intake and exhaust valves via a VCT system. Thus, the total EGR may include the first amount of EGR, the second amount of EGR, and the amount of EGR added by the VCT system. The total amount of EGR is delivered to combustion chamber 30. The first amount of EGR routed through the HP-EGR system may be controlled by adjusting a valve of the HP-EGR system, such as HP-EGR valve 142. HP-EGR valve 142 may be adjusted based on a temperature at a first location and a condensate formation at a second location. For example, HP-EGR valve 142 may be adjusted based on a minimum of an EGR amount corresponding to the temperature of the first location and an EGR amount corresponding to the condensate formation of the second location. The second amount of EGR routed through the LP-EGR system may be controlled by adjusting a valve of the LP-EGR system, such as LP-EGR valve 152. LP-EGR valve 152 may be adjusted based on a temperature at a third location and a condensate formation at a fourth location. For example, LP-EGR valve 152 may be adjusted based on a minimum of an EGR amount corresponding to the temperature of the third location and an EGR amount corresponding to the condensate formation of the fourth location. In this manner, total EGR may be maintained at a desirable level while keeping engine components at or below temperature and condensate constraints.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for controlling an engine in a vehicle during engine operation, the engine having an intake passage, a high pressure exhaust gas recirculation (HP-EGR) system, and a low-pressure exhaust gas recirculation system (LP-EGR) system, comprising:
controlling an amount of EGR via a controller according to a minimum of a first EGR amount corresponding to a temperature at a first location and a second EGR amount corresponding to a condensate formation at a second location.

2. The method of claim 1, wherein the amount of EGR is controlled at a location upstream of the intake passage.

3. The method of claim 1, further comprising scaling the amount of EGR according to a humidity of charge air.

4. The method of claim 1, wherein the engine includes a turbocharger comprising a compressor, and wherein the first location is an output of the compressor.

5. The method of claim 1, wherein the engine includes a turbocharger comprising a compressor, and wherein the second location is an inlet of a compressor.

6. The method of claim 1, wherein the second location is at an EGR sensor.

7. A method for controlling an engine in a vehicle during engine operation, the engine having an intake passage, a high pressure exhaust gas recirculation (HP-EGR) system, and a low pressure exhaust gas recirculation (LP-EGR) system, comprising:
controlling an amount of HP-EGR according to a temperature at a first location and a condensate formation at a second location;
controlling an amount of LP-EGR according to a temperature at a third location and a condensate formation at a fourth location; and
controlling a total amount of EGR according to a temperature at a fifth location and a condensate formation at a sixth location.

8. The method of claim 7, wherein the amount of HP-EGR is controlled based on a minimum of an EGR amount corresponding to the temperature at the first location and an EGR amount corresponding to the condensate formation at the second location.

9. The method of claim 7, wherein the amount of LP-EGR is controlled based on a minimum of an EGR amount corresponding to the temperature at the third location and an EGR amount corresponding to the condensate formation at the fourth location.

10. The method of claim 7, wherein the total amount of EGR is controlled based on a minimum of an EGR amount corresponding to the temperature at the fifth location and an EGR amount corresponding to the condensate formation at the sixth location.

11. The method of claim 7, further comprising scaling the total amount of EGR according to a humidity of charge air.

12. The method of claim 7, further comprising scaling the total amount of EGR according to combustion stability.

13. The method of claim 7, further comprising scaling the amount of HP-EGR according to a humidity of charge air.

14. The method of claim 7, further comprising scaling the amount of LP-EGR according to a humidity of charge air.

15. The method of claim 7, wherein the first location is at an inlet of an HP-EGR valve.

16. The method of claim 7, wherein the second location is at an inlet of an HP-EGR cooler.

17. A system for an engine in a vehicle, comprising:
a turbocharger;
a low-pressure exhaust gas recirculation (LP-EGR) system;
a high-pressure exhaust gas recirculation (HP-EGR) system;
a control system comprising a computer readable storage medium, the medium comprising instructions for:
routing a first amount of EGR through the HP-EGR system;

routing a second amount of EGR through the LP-EGR system;

delivering a total amount of EGR to a combustion chamber;

adjusting a valve of the HP-EGR system based on a temperature of a first location and a condensate formation of a second location; and adjusting a valve of the LP-EGR system based on a temperature of a third location and a condensate formation of a fourth location.

18. The system of claim 17, further comprising adjusting one or more intake and exhaust valves via a VCT system.

19. The system of claim 17, wherein the valve of the HP-EGR system is adjusted based on a minimum of an EGR amount corresponding to the temperature of the first location and an EGR amount corresponding to the condensate formation of the second location.

20. The system of claim 17, wherein the valve of the LP-EGR system is adjusted based on a minimum of an EGR amount corresponding to the temperature of the third location and an EGR amount corresponding to the condensate formation of the fourth location.

* * * * *